United States Patent
Naruse et al.

(10) Patent No.: US 6,466,163 B2
(45) Date of Patent: Oct. 15, 2002

(54) GPS RECEIVER AND PORTABLE COMMUNICATION APPARATUS

(75) Inventors: Tetsuya Naruse, Chiba; Katsuya Hori, Kanagawa; Koji Hasegawa, Kanagawa; Koichiro Teranishi, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/771,905

(22) Filed: Jan. 29, 2001

(65) Prior Publication Data

US 2001/0020912 A1 Sep. 13, 2001

(30) Foreign Application Priority Data

Jan. 31, 2000 (JP) ........................................ 2000-027351

(51) Int. Cl.⁷ ................................................. G01S 5/04
(52) U.S. Cl. ................................ 342/357.1; 342/357.12
(58) Field of Search ........................ 342/357.1, 357.12, 342/357.02; 455/78

(56) References Cited

U.S. PATENT DOCUMENTS

| | | | |
|---|---|---|---|
| 5,301,368 A | * 4/1994 | Hirata | 455/78 |
| 5,423,076 A | 6/1995 | Westergren et al. | 455/86 |
| 5,604,765 A | 2/1997 | Bruno et al. | 375/200 |
| 5,825,327 A | 10/1998 | Krasner | 342/357 |
| 5,955,987 A | 9/1999 | Murphy et al. | 342/357 |
| 5,982,322 A | 11/1999 | Bickley et al. | 342/357 |
| 6,097,974 A | * 8/2000 | Camp, Jr. et al. | 455/575 |
| 6,295,023 B1 | * 9/2001 | Bloebaum | 342/357.06 |
| 6,327,473 B1 | * 12/2001 | Soliman et al. | 455/456 |

FOREIGN PATENT DOCUMENTS

| | | | |
|---|---|---|---|
| WO | 0106669 | 1/2001 | H04B/1/38 |

* cited by examiner

Primary Examiner—Gregory C. Issing
(74) Attorney, Agent, or Firm—Jay H. Maioli

(57) ABSTRACT

A GPS receiver and a portable communication apparatus with the timing of demodulation of a GPS received signal received from a satellite in the global positioning system being controlled in accordance with the timing of transmission of a CDMA transmission signal to a base station in a predetermined communication system, so that the GPS received signal can be accurately demodulated, thereby preventing radio waves that occur during transmission of the CDMA transmission signal from interfering with the GPS received signal. Thus, the GPS received signal can be demodulated without deterioration of reception quality.

20 Claims, 4 Drawing Sheets

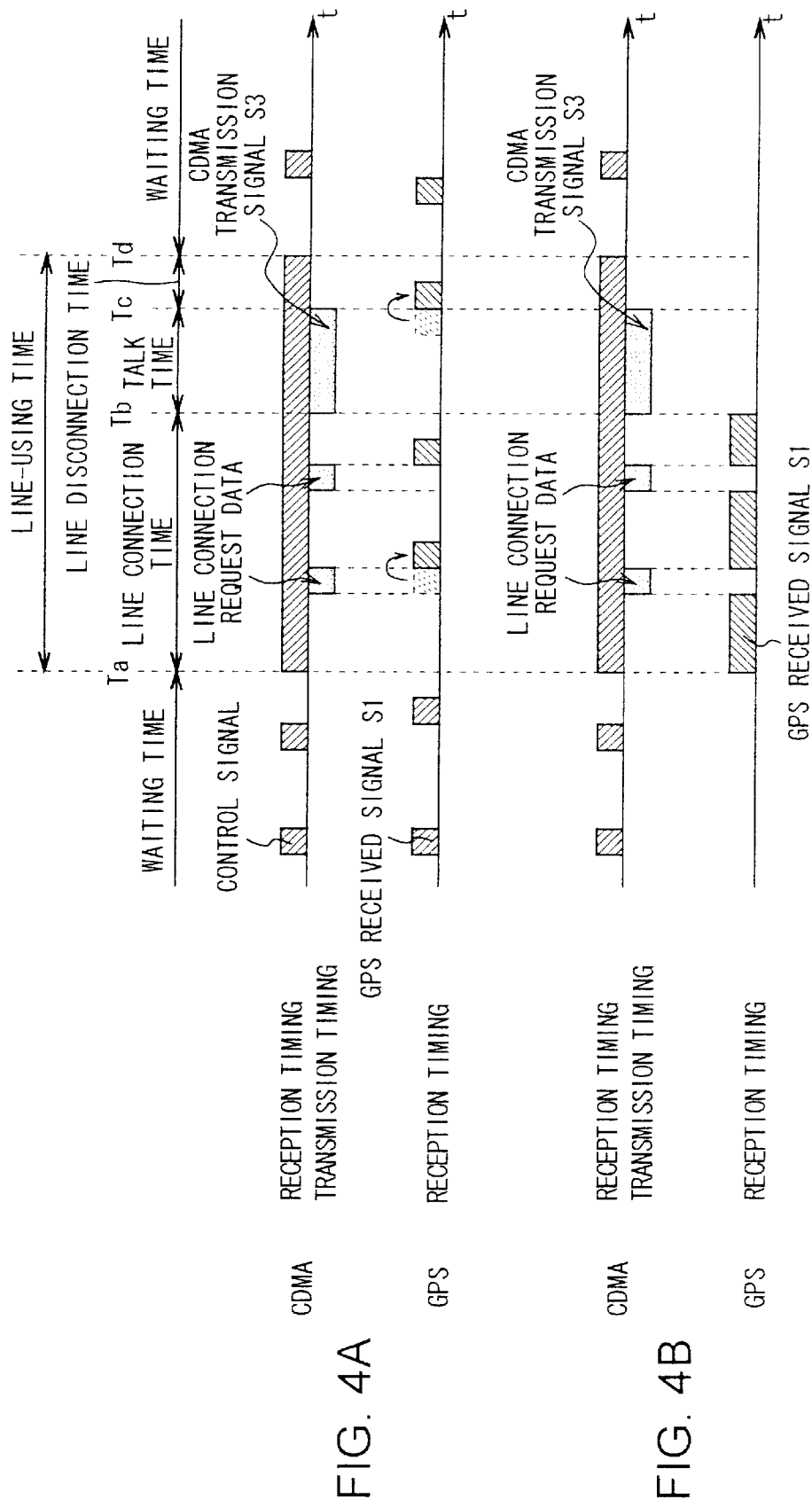

GPS RECEIVER AND PORTABLE COMMUNICATION APPARATUS

BACKGROUND OF THE INVENTION

1. Field of the Invention

The present invention relates to a GPS receiver and a portable communication apparatus, and more particularly, is suitably applied to a receiver for the Global Positioning System (GPS) which is used to measure the position of a moving object, for example.

2. Description of the Related Art

Heretofore, in the GPS, a GPS receiver receives satellite signals transmitted from plural GPS satellites, which are circling around the globe, and analyzes the received satellite signals to calculate the distance between each GPS satellite and the GPS receiver itself. Then, it calculates its current position from the calculated distances.

The satellite signal, which is transmitted from a GPS satellite, is a signal which has been subjected to spread spectrum processing with a pseudo noise (PN) code. This PN code is special for each GPS satellite.

Therefore, the GPS receiver can generate a station PN code for every GPS satellite, make the phase of the generated station PN code match that of the PN code of the satellite signal for synchronization, and perform tracking on the satellite signal for synchronous correction. Then, the GPS receiver performs de-spreading processing to demodulate a navigation message (orbit information for calculating a position) from each GPS satellite. As a result, the current position of the GPS receiver can be calculated from the navigation message.

In addition, such a GPS receiver could have a Code Division Multiple Access (CDMA) transmitting/receiving unit to transmit/receive data to/from the base station in the CDMA cellular system based on the Direct Sequence (DS) scheme conformed with the TIA/IS-95 standard in the United States of America, for example, so that the CDMA transmitting/receiving unit can inform the base station in the CDMA cellular system of its current position calculated.

Actually, as shown in FIG. 1, the GPS receiver 1 roughly consists of a GPS receiving unit 1 to demodulate a GPS received signal SI received from each GPS satellite, and a CDMA transmitting/receiving unit 3 to demodulate a CDMA received signal S2 received from a base station in the CDMA cellular system and to transmit a CDMA transmission signal S3, produced by modulating transmission data, to the base station in the CDMA cellular system.

The CDMA transmitting/receiving unit 3 inputs the received CDMA received signal S2 to a CDMA demodulator 4. The CDMA demodulator 4 synchronizes the CDMA received signal S2 to a CDMA demodulation control signal S4 which is supplied from a CDMA control circuit 5, performs the demodulation processing on it, and then outputs the resultant received data S5 to the CDMA control circuit 5.

Further, the CDMA control circuit 5 transmits transmission data S7 such as voices to be transmitted, to a CDMA modulator 6, and also transmits a CDMA modulation control signal S8, which is to control the spread spectrum processing in the CDMA modulator 6, to the CDMA modulator 6.

The CDMA modulator 6 modulates the transmission data S7 in accordance with the CDMA modulating control signal S8 and transmits the resultant signal, which has been subjected to the spread spectrum processing, as a CDMA transmission signal S3 to a high frequency circuit and to the base station in the CDMA cellular system via a CDMA antenna (not shown).

Further, the CDMA control circuit 5 produces a system time signal S6. which is a standard timing of synchronization and demodulation processing, based on the result of demodulation, that is, the received data S5, and supplies it to a GPS control circuit 8 of the GPS receiving unit 2.

The CDMA received signal S2 is produced based on the GPS time which is obtained in such a manner that the base station in the CDMA cellular system receives and analyzes a satellite signal transmitted from the GPS satellite, so that the GPS control circuit 8 can roughly recognize the acquirement of synchronization and the demodulation timing of the demodulation processing for the GPS received signal SI based on the system time signal S6.

As described above, in the GPS receiving unit 2, the GPS control circuit 8 roughly recognizes the acquirement of synchronization and the demodulation timing of the demodulation processing for the GPS received signal SI based on the system time signal S6, and supplies a GPS demodulation control signal S9 based on the demodulation timing to the GPS demodulator 7.

The GPS demodulator 7 synchronizes and demodulates the GPS received signal SI, received from each GPS satellite, based on the GPS demodulation control signal S9 in a short time, thereby making it possible to remarkably reduce power consumption relating to the acquirement of synchronization and the demodulation processing.

Further, the GPS demodulator 7 outputs received data S10 from every GPS satellite, which is obtained by the demodulation processing, to the GPS control circuit 8. The GPS control circuit 8 calculates the current position of the GPS receiver 1 from the plurality of received data S10, which is obtained by the demodulation processing.

Thus the GPS receiver 1 informs the base station in the CDMA cellular system of its current position in such a manner that the current position obtained by the GPS control circuit 8 is passed through the CDMA control circuit 5 as the transmission data S7 and is modulated by the CDMA modulator 6 and the resultant CDMA transmission signal S3 is transmitted to the base station in the CDMA cellular system.

In the GPS receiving unit 2 of the GPS receiver 1 with the above structure, for example, the GPS receiving unit continuously receives the GPS received signal SI as shown in FIG. 2A. And the CDMA transmitting/receiving unit 3 intermittently receives the control signal transmitted from the base station in the CDMA cellular system during the waiting time, until time Ta, continuously receives the control signal from the base station during the line-using time, between time Ta and time Td, and intermittently receives the control signal from the base station again during the waiting time, after time Td.

At this time, the GPS receiver 1 intermittently transmits line connection request data to the base station at predetermined intervals during the line-connection time, between time Ta and time Tb, and continuously transmits the CDMA transmission signal S3 to the base station during the talk time, between time Tb and time Tc.

Therefore, the GPS receiver 1 outputs from the high frequency circuit much stronger radio waves than the received signal S1 which is received by the GPS receiving unit 2, while transmitting the line connection request data and continuously transmitting the CDMA transmission signal S3, which causes a problem in that interference of these radio waves with the GPS received signal S1 remarkably deteriorates reception quality.

Further, in the GPS receiver 1, in the case where the GPS receiving unit 2 intermittently receives the GPS received signal S1 to reduce the power consumption as shown in FIG. 2B, at the same transmission/reception timing in the CDMA transmitting/receiving unit 3 as FIG. 2A, when the intermittent reception timing of the GPS received signal S1, the intermittent transmission timing of the line connection request data during the line connection time, and the continuous transmission timing of the CDMA transmission signal S3 during the talk time coincide with each other, the strong radio waves, which are outputted when the line connection request data and the CDMA transmission signal S3 are transmitted, interfere with the GPS received signal S1, which remarkably deteriorates reception quality.

SUMMARY OF THE INVENTION

In view of the foregoing, an object of this invention is to provide a GPS receiver and a portable communication apparatus which allow a satellite signal to be demodulated without deterioration of reception quality.

The foregoing object and other objects of the invention have been achieved by the provision of a GPS receiver and a portable communication apparatus. The demodulation timing of a satellite signal received from a satellite of the global positioning system is controlled in accordance with transmission timing of a transmission signal to a base station in a predetermined communication system, which prevents radio waves which occur in transmission of the transmission signals from interfering with the satellite signal and allows the satellite signal to be demodulated correctly. Thus, the satellite signal can be demodulated without deterioration of reception quality.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 4A and 4B are timing charts showing reception timing in the present invention.

DETAILED DESCRIPTION OF THE EMBODIMENT

Figure 1:
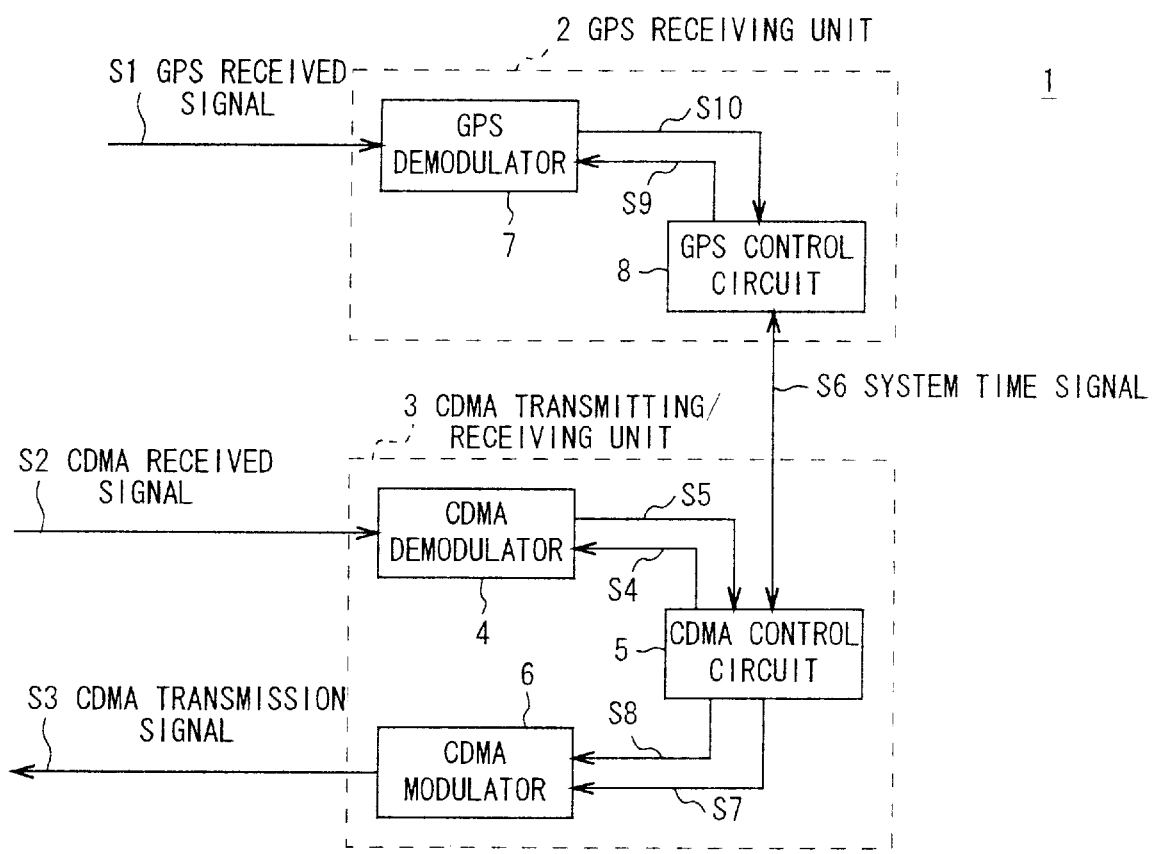
FIG. 1 is a block diagram showing the structure of the conventional GPS receiver.
Figure 2:
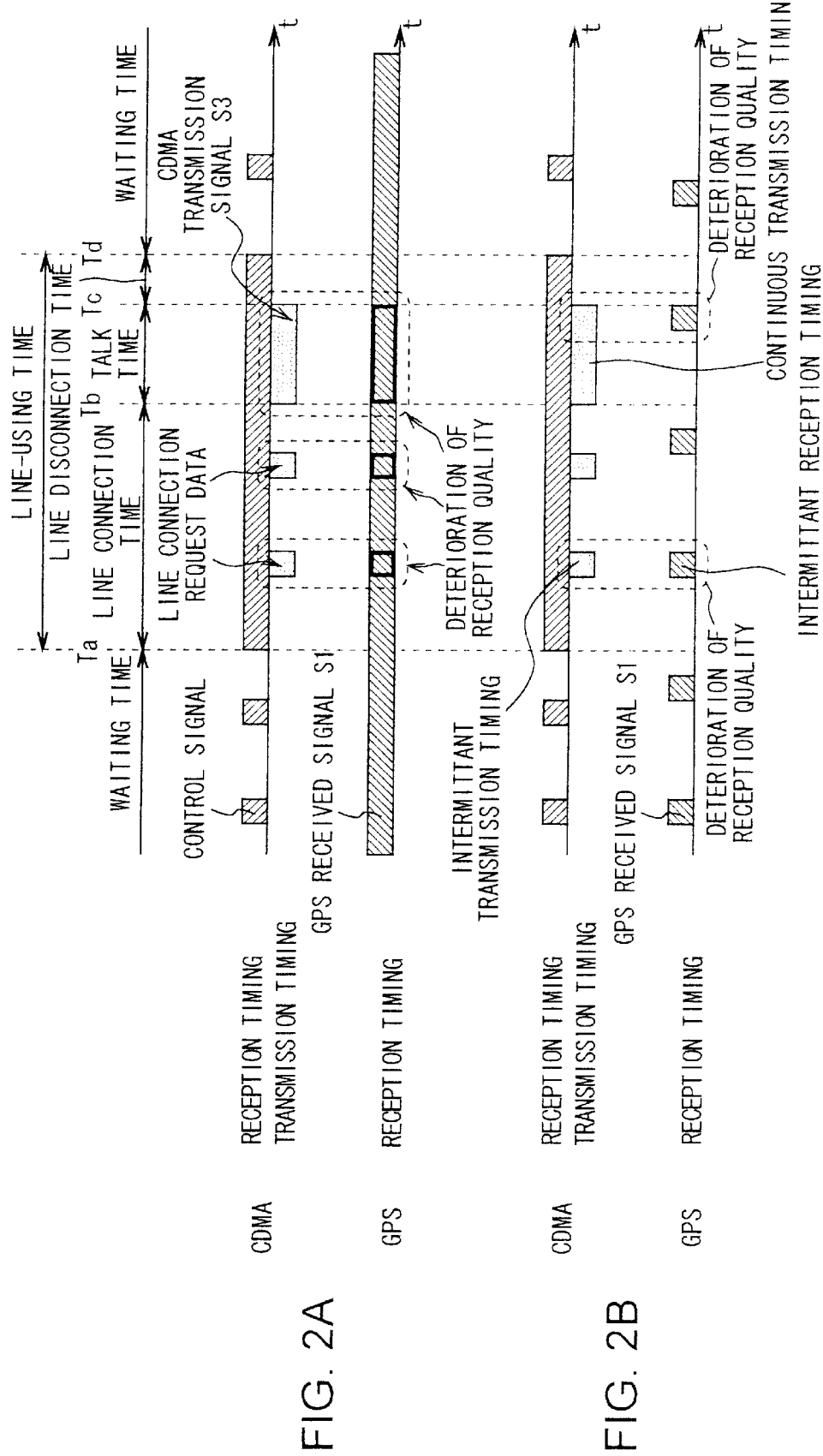
FIGS. 2A and 2B are timing charts showing the conventional reception timing.
Figure 3:
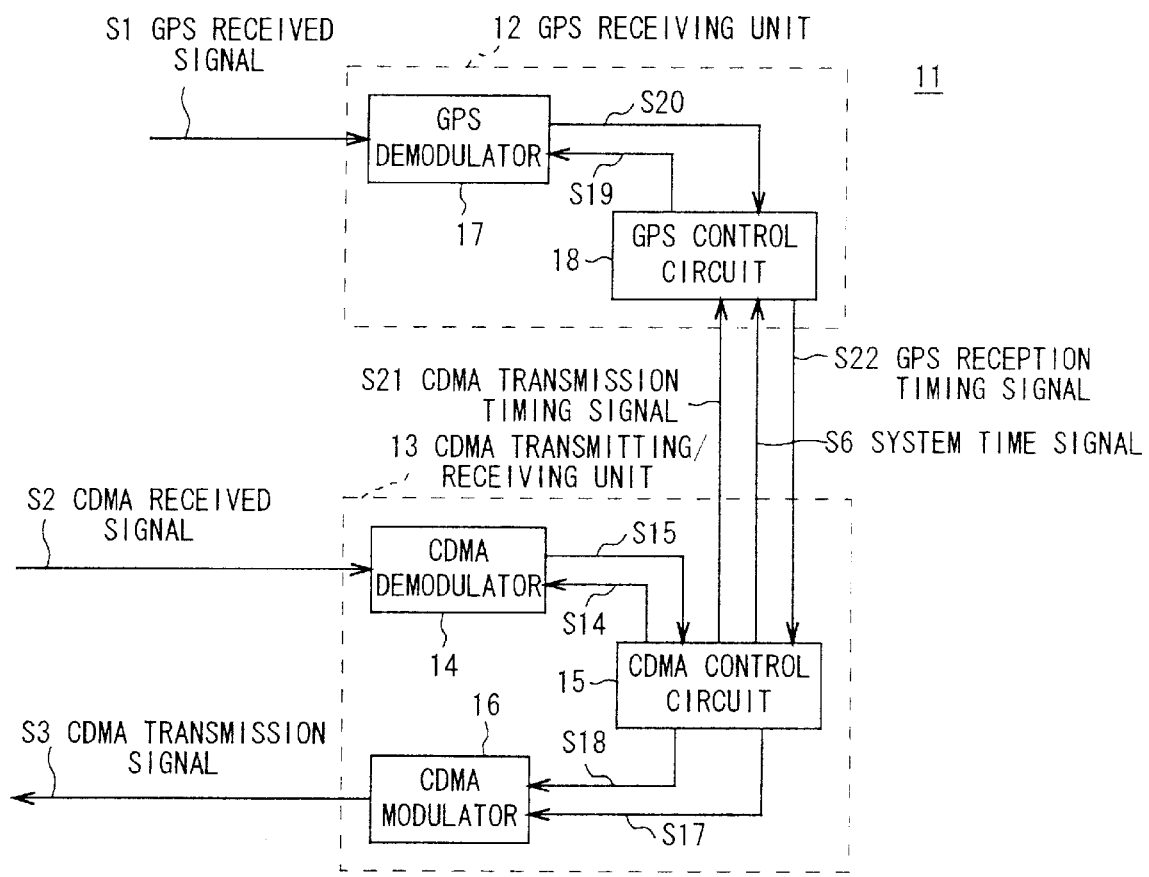
FIG. 3 is a block diagram showing the structure of the GPS receiver in the present invention.

Preferred embodiments of this invention will be described with reference to the accompanying drawings:

In FIG. 3 in which the same reference numerals are attached to parts corresponding to FIG. 1, numeral 11 shows a GPS receiver of the present invention as a whole and consists of a GPS receiving unit 12 to demodulate a GPS received signal S1 received from each GPS satellite and a CDMA transmitting/receiving unit 13 to demodulate a CDMA received signal S2 received from a base station in the Code Division Multiple Access (CDMA) cellular system based on the DS (Direct Sequence) scheme under the TIA/IS-95 standard of the United States to transmit to the base station in the CDMA cellular system the CDMA transmission signal S3 produced by modulating transmission data.

The CDMA transmitting/receiving unit 13 inputs the received CDMA received signal S2 to a CDMA demodulator 14. The CDMA demodulator 14 synchronizes the CDMA received signal S2 to the CDMA reception control signal S14 which is supplied from the CDMA control circuit 15, demodulates the resultant, and then outputs the received data S15, which is the result of the demodulation, to the CDMA control circuit 15.

Further, the CDMA control circuit 15 transmits transmission data S17 such as voices to be transmitted, to a CDMA modulator 16 and also transmits to the CDMA modulator 16 a CDMA modulation control signal S18 which is to control the spread spectrum processing in the CDMA modulator 16.

The CDMA modulator 16 modulates the transmission data S 17 in accordance with the CDMA modulation control signal S18, and transmits a CDMA transmission signal S3, which has been subjected to the spread spectrum processing, to a high frequency circuit and to the base station in the CDMA cellular system via a CDMA antenna (not shown).

Further, the CDMA control circuit 15 produces a system time signal S6, which is a standard of acquirement of synchronization and the demodulation processing, based on the received data S15, which is obtained by the demodulation, and supplies it to a GPS control circuit 18 of the GPS receiving unit 12.

The CDMA received signal S2 is produced based on the GPS time which is obtained in such a manner that the base station in the CDMA cellular system receives and analyzes a satellite signal transmitted from the GPS satellite, so that the GPS control circuit 18 can roughly recognize the acquirement of synchronization and the demodulation timing of the demodulation processing for the GPS received signal S1 from the system timing signal S6.

Therefore, in the GPS receiving unit 12, the GPS control circuit 18 roughly recognizes the acquirement of synchronization and the demodulation timing of demodulation processing from the system time signal S6, and supplies a GPS demodulation control signal S19 based on the demodulation timing to the GPS demodulator 17.

The GPS demodulator 17 synchronizes and demodulates the GPS received signal S1, which is received from each GPS satellite, in accordance with the GPS demodulation control signal S19 in a short time, which can remarkably reduce power consumption relating to the acquirement of synchronization and the demodulation processing.

Further, the GPS demodulator 17 outputs received data S20 from every GPS satellite, which is produced through demodulation, to the GPS control circuit 18. The GPS control circuit 18 calculates its current position from the plurality of received data S20, which is the result of demodulation.

Therefore, the GPS receiver 11 informs the base station in the CDMA cellular system of the current position in such a manner that its current position obtained by the GPS control circuit 18 is passed through the CDMA control circuit 15 as transmission data S17 and is modulated by the CDMA modulator 16 and the resultant CDMA transmission signal S3 is transmitted to the base station in the CDMA cellular system.

In addition to the aforementioned process, in the GPS receiver 11, the CDMA control circuit 15 supplies to the GPS control circuit 18 of the GPS receiving unit 12, a CDMA transmission timing signal S21 which indicates the time when the line connection request data and the CDMA transmission signal S3 are transmitted from the CDMA transmitting/receiving unit 13 as shown in FIG. 4A.

At this time, the GPS control circuit 18 produces the GPS demodulation control signal S19 which indicates the demodulation timing to execute the demodulation processing when the CDMA transmitting/receiving unit 13 does not transmit the line connection request data and the CDMA transmission signal S3 in accordance with the CDMA transmission timing signal S21, and outputs it to the GPS demodulator 17.

As a result, in the case of intermittently receiving the GPS received signal S1, the GPS receiving unit 12 demodulates the GPS received signal S1 with the GPS demodulator 17 when the CDMA transmitting/receiving unit 13 does not transmit the line connection request data and the CDMA transmission signal S3, in accordance with the GPS demodulation control signal S19.

Further, for example, the GPS receiving unit 12 demodulates the GPS received signal S1 during the line connection time (between time Ta and time Tb) before the talk time (between time Tb and time Tc) as shown in FIG. 4B, and calculates the current position with the GPS control circuit 18 based on the received data S20, which is the result of demodulation. In the case of transmitting the calculated current position as the CDMA transmission signal S3 during the talk time, the GPS receiving unit 12 demodulates the GPS received signal S1 when the line request data is not transmitted, in accordance with the GPS demodulation control signal S19.

Actually, at this time, the GPS receiving unit 12 does not stop demodulating the received signal S1 while the line connection request data is transmitted, but continues the demodulation processing and transmits to the GPS control circuit 18 only the received data S20 which is obtained when transmission is not performed, not the received data S20 which is obtained through the demodulation processing when the line connection request data is transmitted.

Therefore, the GPS control circuit 18 can correctly calculate the current position from the received data S20 which does not get interference from the strong radio waves which occur when the line connection request data is transmitted.

In the GPS receiver 11 with the aforementioned structure, the GPS control circuit 18 of the GPS receiving unit 12 recognizes the transmission timing of the line connection request data and the CDMA transmission signal S3 based on the CDMA transmission timing signal S21 supplied from the CDMA transmitting/receiving unit 13, and demodulates the GPS received signal S1 at the time when the transmission is not performed.

Therefore, the GPS receiver 11 can demodulate the GPS received signal S1 which does not get interference from radio waves which occur when the CDMA transmitting/receiving unit 13 transmits the line connection request data and the CDMA transmission signal S3, thus making it possible to efficiently obtain the accurate demodulation result in a short time.

Further, the GPS receiver 11 calculates the current position without using the demodulation result of the time when the line connection request data is transmitted during the line connection time as shown in FIG. 4B, even if the current position has to be provided in an emergency, thus making it possible to efficiently recognize the current position in a short time before the talk time and also to reduce the power consumption.

According to the aforementioned structure, the GPS receiver 11 controls the demodulation timing of the GPS received signal S1 in accordance with the CDMA transmission timing signal S21 obtained by the CDMA transmitting/receiving unit 13, thus making it possible to execute the demodulation processing without deterioration of reception quality, preventing the GPS received signal S1 from receiving interference from radio waves which occur when the CDMA transmitting/receiving unit 13 performs the transmission processing.

Note that, the aforementioned embodiment is about the case where the GPS received signal S1 is received when the CDMA transmission signal S3 is not transmitted. The present invention, however, is not limited to this case and in the case where the GPS receiving unit 12 intermittently receives the GPS received signal S1, the GPS control circuit 18 outputs to the CDMA control circuit 15 the GPS reception timing signal S22 to intermittently receive the GPS received signal S1, and the CDMA transmission signal S3 can be transmitted when the GPS received signal S1 is not received, under the control of the CDMA control circuit 15.

Further, the aforementioned embodiment is about the case where the CDMA transmission signal S3, which is produced by the CDMA modulator 16 of the CDMA transmitting/receiving unit 13, is transmitted. This invention, however, is not limited to this embodiment and a TDMA transmission signal which is produced by a TDMA modulator of a TDMA transmitting/receiving unit in a Time Division Multiple Access (TDMA) cellular system can be transmitted.

In this case, the GPS received signal S1 is demodulated at timing of a time slot when transmission is not performed, so that reception quality of the GPS received signal S1 does not deteriorate.

Further, the aforementioned embodiment is about the case where the GPS received signal S1 is demodulated when the CDMA transmission signal S3 is not transmitted. This invention, however, is not limited to this case. The CDMA transmission signal S3 is transmitted in a form of transmission packets, which are units of a predetermined amount of data, the GPS received signal S1 can be demodulated at a time when the transmission packets are not transmitted.

Furthermore, the aforementioned embodiment is about the case where the current position is calculated from the received data S20, which is the result of demodulation, during the line connection time before the talk time as shown in FIG. 4B. This invention, however, is not limited to this case. When the calculation of the current position is not finished during the line connection time, the transmission of the CDMA transmission signal S3 to be transmitted to the base station in the CDMA cellular system during the talk time can be delayed.

Furthermore, the aforementioned embodiment is about the case where the present invention is applied to the GPS receiver 11. This invention, however, is not limited to this case and can be applied to a portable communication apparatus such as a portable telephone with the GPS receiving unit 12.

According to the present invention as described above, demodulation timing of a satellite signal received from a satellite in a global positioning system is controlled in accordance with transmission timing which is used to transmit a transmission signal to the base station in a predetermined communication system, so that the satellite signal can be accurately demodulated, preventing radio waves, which occur during transmitting transmission signals, from interfering with the satellite signal. Thus the satellite signal can be demodulated without deterioration of reception quality.

While there has been described in connection with] the preferred embodiments of the invention have been described, it will be obvious to those skilled in the art that various changes and modifications may be made. The appended claims are intended to cover all such changes and modifications as fall within the true spirit and scope of the invention. claim are intended to cover all such changes and modifications as fall within the true spirit and scope of the invention.

What is claimed is:

1. A GPS receiver, comprising:
    transmission timing means for providing transmission timing of a transmission signal to a base station in a predetermined communication system;
    demodulating means for receiving a satellite signal from a GPS satellite and for demodulating said satellite signal received; and
    demodulation control means for controlling demodulation timing of said demodulating of said satellite signal in accordance with said transmission timing from said transmission timing means.

2. The GPS receiver according to claim 1, wherein said demodulation control means controls said demodulating of said satellite signal such that demodulation occurs when said transmission signal is not transmitted based on said transmission timing.

3. The GPS receiver according to claim 1, wherein said demodulation control means controls said demodulating of said satellite signal such that demodulation occurs before continuously transmitting said transmission signal based on said transmission timing.

4. The GPS receiver according to claim 1, wherein said demodulation control means controls said demodulating of said satellite signal such that demodulation occurs before continuously transmitting said transmission signal and when said transmission signal is not intermittently transmitted based on said transmission timing.

5. The GPS receiver according to claim 1, further comprising:
    demodulation timing informing means for informing said demodulating means of said demodulation timing to be used by said demodulating means; and
    transmission control means for controlling said transmission timing to transmit said transmission signal to said base station in said predetermined communication system in accordance with said demodulation timing from said demodulation timing informing means.

6. The GPS receiver according to claim 5, wherein said transmission control means delays said transmission timing of said transmission signal to be transmitted to said base station in said predetermined communication system until a result of said demodulation is obtained by said demodulating means in accordance with said demodulation timing.

7. The GPS receiver according to claim 1, wherein said transmission signal is a line connection request signal to said base station in said communication system.

8. The GPS receiver according to claim 1, wherein said transmission signal is transmitted in a form of transmission packets containing a predetermined amount of data, and
    said demodulation control means demodulates said satellite signal when said transmission packets are not transmitted.

9. The GPS receiver according to claim 1, wherein said communication system is a Code Division Multiple Access (CDMA) cellular system.

10. The GPS receiver according to claim 1, wherein said communication system is a Time Division Multiple Access (TDMA) cellular system.

11. A portable communication apparatus for transmitting a transmission signal to a base station and for receiving another transmission signal from said base station in a predetermined communication system, comprising:
    transmission timing means for providing transmission timing of the transmission signal transmitted to the base station in said predetermined communication system;
    demodulating means for receiving a satellite signal from a GPS satellite and for demodulating said satellite signal received; and
    demodulation control means for controlling demodulation timing of said demodulating of said satellite signal in accordance with said transmission timing from said transmission timing means.

12. The portable communication apparatus according to claim 11, wherein said demodulation control means controls said demodulating of said satellite signal such that demodulation occurs when said transmission signal is not transmitted based on said transmission timing.

13. The portable communication apparatus according to claim 11, wherein said demodulation control means controls said demodulating of said satellite signal such that demodulation occurs before continuously transmitting said transmission signal based on said transmission timing.

14. The portable communication apparatus according to claim 11, wherein said demodulation control means controls said demodulating of said satellite signal such that demodulation occurs before continuously transmitting said transmission signal and before said transmission signal is intermittently transmitted based on said transmission timing.

15. The portable communication apparatus according to claim 11, further comprising:
    demodulation timing informing means for informing said demodulating means of said demodulation timing to be used by said demodulating means; and
    transmission control means for controlling said transmission timing to transmit said transmission signal to said base station in said communication system in accordance with said demodulation timing from said demodulation timing informing means.

16. The portable communication apparatus according to claim 15, wherein said transmission control means delays said transmission timing of said transmission signal to be transmitted to said base station in said predetermined communication system until a result of said demodulation is obtained by said demodulating means in accordance with said demodulation timing.

17. The portable communication apparatus according to claim 11, wherein said transmission signal is a line connection request signal to said base station in said predetermined communication system.

18. The portable communication apparatus according to claim 11, wherein said transmission signal is transmitted in a form of transmission packets containing a predetermined amount of data and said demodulation control means demodulates said satellite signal when said transmission packets are not transmitted.

19. The portable communication apparatus according to claim 11, wherein said communication system is a Code Division Multiple Access (CDMA) cellular system.

20. The portable communication apparatus according to claim 11, wherein said communication system is a Time Division Multiple Access (TDMA) cellular system.

* * * * *